US008048402B2

(12) United States Patent
Cao et al.

(10) Patent No.: US 8,048,402 B2
(45) Date of Patent: Nov. 1, 2011

(54) SYNTHESIS OF MOLECULAR SIEVES HAVING THE CHABAZITE FRAMEWORK TYPE AND THEIR USE IN THE CONVERSION OF OXYGENATES TO OLEFINS (75) Inventors: Guang Cao, Branchburg, NJ (US); Matu J. Shah, Hackettstown, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1250 days.

(21) Appl. No.: 11/206,444

(22) Filed: Aug. 18, 2005

(65) Prior Publication Data

US 2007/0043249 A1 Feb. 22, 2007

(51) Int. Cl.
| C01B 33/36 | (2006.01) |
| C01B 39/02 | (2006.01) |
| C01B 39/04 | (2006.01) |
| C01B 39/00 | (2006.01) |
| C01F 7/00 | (2006.01) |

(52) U.S. Cl. ........ 423/704; 423/701; 423/702; 423/703; 423/705; 423/706; 423/708; 423/709

(58) Field of Classification Search ........... 423/700–718
See application file for complete search history.

(56) References Cited

U.S. PATENT DOCUMENTS

| 4,310,440 | A | | 1/1982 | Wilson et al. | 252/435 |
| 4,440,871 | A | | 4/1984 | Lok et al. | 502/214 |
| 4,610,854 | A | | 9/1986 | Zones | 423/326 |
| 5,096,684 | A | | 3/1992 | Guth et al. | 423/306 |
| 5,187,132 | A | | 2/1993 | Zones et al. | 502/64 |
| 5,262,550 | A | | 11/1993 | Crocco et al. | 549/531 |
| 5,672,331 | A | * | 9/1997 | Verduijn | 423/702 |

(Continued)

FOREIGN PATENT DOCUMENTS

EP 0 993 867 4/2000

(Continued)

OTHER PUBLICATIONS

Zones, Stacy I. and Robert A. Van Nordstrand, Templates in the Transformation of Zeolites to Organozeolites: Cubic P Conversions, Novel Materials in Heterogeneous Catalysis, 1990, ACS Symposium Series, American Chemical Society, pp. 14-24.*

(Continued)

Primary Examiner — David M. Brunsman
Assistant Examiner — Kevin Johnson
(74) Attorney, Agent, or Firm — Kevin M. Faulkner; Frank E. Reid (57) ABSTRACT

The synthesis of a crystalline aluminophosphate or silicoaluminophosphate molecular sieve having a chabazite-type framework type is conducted in the presence of an organic directing agent having the formula (I)

$$[R^1R^2R^3N-R^4]^+X^- \qquad (I)$$

wherein $R^1$, $R^2$ and $R^3$ are independently selected from the group consisting of alkyl groups having from 1 to 3 carbon atoms and hydroxyalkyl groups having from 1 to 3 carbon atoms; $R^4$ is selected from the group consisting of 4- to 8-membered cycloalkyl groups, optionally substituted by 1 to 3 alkyl groups having from 1 to 3 carbon atoms; 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S; and aromatic groups optionally substituted by 1 to 3 alkyl groups, said alkyl groups having from 1 to 3 carbon atoms; and $X^-$ is an anion.

10 Claims, 4 Drawing Sheets (a) - No seeds (b) - Seeded

U.S. PATENT DOCUMENTS

| | | | |
|---|---|---|---|
| 5,958,366 A * | 9/1999 | Smith et al. | 423/700 |
| 6,162,415 A | 12/2000 | Liu et al. | 423/706 |
| 6,620,983 B1 | 9/2003 | Cao et al. | |
| 6,680,278 B2 | 1/2004 | Cao et al. | |
| 6,793,901 B2 | 9/2004 | Cao et al. | |
| 6,914,030 B2 | 7/2005 | Cao et al. | |
| 2002/0165089 A1 | 11/2002 | Janssen et al. | |
| 2003/0232006 A1 | 12/2003 | Cao et al. | 423/705 |
| 2004/0089001 A1 * | 5/2004 | Kakiuchi et al. | 62/112 |
| 2004/0253163 A1 | 12/2004 | Cao et al. | 423/305 |

FOREIGN PATENT DOCUMENTS

| | | |
|---|---|---|
| WO | WO 03/106341 | 12/2003 |
| WO | WO 2005/063623 | 7/2005 |

OTHER PUBLICATIONS

"Atlas of Zeolite Framework Types", 2001, 5th Edition, p. 96.

Wilson, et al, Microporous and Mesoporous Materials, 29, pp. 117-126, 1999.

Harris, T.V., "A Study of Guest/Host Energetics for the Synthesis of Cage Structures NON and CHA", Studies in Surface Science and Catalysis (1994), 84 (Zeolites and Related Microporous Materials, Pt. 1), pp. 29-36 (Abstract).

Van Nordstrand, R.A., et al, (Synthesis and Characterization of a New) All-Silica Molecular Sieve, (SSZ-24), Isostructural with AlPO4-5 (Aluminum Phosphate), 3rd Chem. Congr. North Am./195th ACS Natl. Meet. Div. Ind. Eng. Chem., Pet. Chem., Fuel Chem. Symp. (Toronto, Ont. Jun. 5-11, 1988) ACS Symp. Serv. N. 368, pp. 236-245 (1988) (Abstract).

Wilson, Stephen T., Verified Syntheses of Zeolitic Materials. Templating in Molecular Sieve Synthesis [online] 2nd revised edition. UOP Research Center. [retrieved on Aug. 7, 2009]. Retrieved from the Internet: < URL: http://www.iza-online.org/synthesis/VS_2ndEd/Templating.htm>.

Mark E. Davis and Raul F. Lobo, "Zeolite and Molecular Sieve Synthesis", Chem. Mater. 1992, 4, pp. 756-768.

Donald W. Breck, "Kinetics and Mechanism of Zeolite Crystallization", Zeolite Molecular Sieves, pp. 333-346.

Davis et al., "Zeolite and Molecular Sieve Synthesis", Chem. Mater. 1992, 4, pp. 756-768.

* cited by examiner

(a) - No seeds (b) – Seeded

SYNTHESIS OF MOLECULAR SIEVES HAVING THE CHABAZITE FRAMEWORK TYPE AND THEIR USE IN THE CONVERSION OF OXYGENATES TO OLEFINS

FIELD OF INVENTION

This invention relates to the synthesis of aluminophosphate and silicoaluminophosphate molecular sieves having the chabazite framework type and their use in the conversion of oxygenates, particularly methanol, to olefins, particularly ethylene and propylene.

BACKGROUND OF INVENTION

The conversion of oxygenates to olefins (OTO) is currently the subject of intense research because it has the potential for replacing the long-standing steam cracking technology that is today the industry-standard for producing world scale quantities of ethylene and propylene. The very large volumes involved suggest that substantial economic incentives exist for alternate technologies that can deliver high throughputs of light olefins in a cost efficient manner. Whereas steam cracking relies on non-selective thermal reactions of naphtha range hydrocarbons at very high temperatures, OTO exploits catalytic and micro-architectural properties of acidic molecular sieves under milder temperature conditions to produce high yields of ethylene and propylene from methanol.

Current understanding of the OTO reactions suggests a complex sequence in which three major steps can be identified: (1) an induction period leading to the formation of an active carbon pool (alkyl-aromatics), (2) alkylation-dealkylation reactions of these active intermediates leading to products, and (3) a gradual build-up of condensed ring aromatics. OTO is therefore an inherently transient chemical transformation in which the catalyst is in a continuous state of change. The ability of the catalyst to maintain high olefin yields for prolonged periods of time relies on a delicate balance between the relative rates at which the above processes take place. The formation of coke-like molecules is of singular importance because their accumulation interferes with the desired reaction sequence in a number of ways. In particular, coke renders the carbon pool inactive, lowers the rates of diffusion of reactants and products, increases the potential for undesired secondary reactions and limits catalyst life.

Over the last two decades, many catalytic materials have been identified as being useful for carrying out the OTO reactions. Crystalline molecular sieves are the preferred catalysts today because they simultaneously address the acidity and morphological requirements for the reactions. Some of the most useful molecular sieves for oxygenate converting reactions are the aluminophosphates and metalloaluminophosphates, such as the silicoaluminophosphates (SAPO's). There are a wide variety of SAPO molecular sieves known in the art, of these the more important examples include SAPO-5, SAPO-11, SAPO-18, SAPO-34, SAPO-35, SAPO-41, and SAPO-56. For the OTO process, SAPO molecular sieves having the CHA framework and especially SAPO-34 are particularly important catalysts.

The CHA framework type has a double six-ring structure in an ABC stacking arrangement. The pore openings of the structure are defined by eight member rings that have a diameter of about 4.0 Å, and cylindrical cages within the structure of approximately 10×6.7 Å ("Atlas of Zeolite Framework Types", 2001, 5 th Edition, p. 96). Other SAPO molecular sieves of the CHA framework type include SAPO-44, SAPO-47 and ZYT-6.

The synthesis of SAPO molecular sieves is a complicated process. There are a number of variables that need to be controlled in order to optimize the synthesis in terms of purity, yield and quality of the SAPO molecular sieve produced. A particularly important variable is the choice of synthesis template, which usually determines which SAPO framework type is obtained from the synthesis. U.S. Pat. No. 4,310,440 teaches that "not all templating agents suitably employed in the preparation of certain species . . . are suitable for the preparation of all members of the generic class." It is also well known that the same template may induce the formation of different framework types.

In U.S. Pat. No. 4,440,871, the synthesis of a wide variety of SAPO materials of various framework types are described with a number of specific examples. Also disclosed are a large number of possible organic templates, with some specific examples. In the specific examples a number of CHA framework type materials are described. The preparation of SAPO-34 is reported, using tetraethylammonium hydroxide (TEAOH), or isopropylamine, or mixtures of TEAOH and dipropylamine (DPA) as templates. Also disclosed in this patent is a specific example that utilizes cyclohexylamine in the preparation of SAPO44. Although other template materials are described in this patent there are no other templates indicated as being suitable for preparing SAPO's of the CHA framework type. Certain aminoalcohols are mentioned, including triethanolamine, N-methyldiethanolamine, N-methylethanolamine, N,N-dimethylethanolamine and N,N-diethylethanolamine, as possible templates for SAPO molecular sieves. Of these materials, N,N-diethylethanolamine is shown to produce SAPO-5, which is of the AFI framework type. For the other aminoalcohols no indication is provided as to which SAPO or which framework type may be obtained through their use.

Since the synthesis of SAPO-34 was reported in U.S. Pat. No. 4,440,871, tetraethylammonium hydroxide (TEAOH) either alone, or in combination with dipropylamine (DPA), has been the preferred template for preparing SAPO-34. In fact, TEAOH is currently the only quaternary ammonium template known for use in the synthesis of SAPO-34 and other CHA framework type silicoaluminophosphates. However, there are problems associated with the use of TEAOH and DPA. When used alone, TEAOH affords a limited range of synthesis parameters. For example, under certain conditions TEAOH will also template the synthesis of SAPO-18 which has the AEI framework type. TEAOH is thus relatively intolerant to synthesis condition variations. TEAOH is sometimes combined with DPA. However, DPA has a low boiling point (110° C.) resulting in the need for production facilities that can handle high pressures. In certain countries, the use of DPA requires special regulatory authorizations due to its toxicity. Also, DPA is an aggressive template and is often implicated in re-dissolution of the silicoaluminophosphate molecular sieve during its synthesis, resulting in poor quality crystalline product due to surface pitting of the crystals. Finally, it has proved difficult up to now to make pure phase CHA silicoaluminophosphate molecular sieves with a low silica to alumina ratio.

In U.S. Pat. No. 4,440,871, it was reported that SAPO44 was obtained "as the major phase" using cyclohexylamine as a template. In U.S. Pat. No. 6,162,415, relatively pure CHA SAPO-44 was obtained using the same template but with control of the ratio of template to aluminum source and the ratio of phosphorus source to aluminum source. In EP 0 993

867, it was reported that the use of methylbutylamine resulted in SAPO-47 and the use of cyclohexylamine resulted in impure SAPO-44. Methylbutylamine has an even lower boiling point, at 91° C., than DPA.

In the art various attempts have been made to improve the synthesis of $AlPO_4$ and SAPO molecular sieves. One particular desideratum has been lowering the silicon content of the molecular sieve without introducing impurity phases, since it is known that low silicon content has the effect of reducing propane formation and decreasing catalyst deactivation See, for example, Wilson et al., Microporous and Mesoporous Materials, 29, 117-126, 1999. One approach to lowering silicon content has been the addition of a source of fluoride ions to the synthesis mixture.

Thus in U.S. Pat. No. 5,096,684, morpholine and tetraethylammonium hydroxide were found to template the production of SAPO-34 when in the presence of HF. According to this reference, the use of HF in combination with the organic template results in silicoaluminophosphates which have improved thermal and hydrolytic stability. In a Ph.D. thesis (E. H. Halvorsen, University of Oslo, 1996), it was reported that low silica SAPO-34, designated as UiO-S4, was produced using TEAOH template in combination with HF.

However, fluoride based syntheses have the inherent disadvantages that the use of HF presents health and safety problems and requires special processing facilities. There is, therefore, a need for alternative processes for producing pure phase, low silicon, CHA type silicoaluminophosphate molecular sieves and especially for processes which can operate in the absence of fluoride.

U.S. Published Patent Application No. 2003/0232006, published Dec. 18, 2003, discloses a method of synthesizing pure phase CHA framework type silicoaluminophosphate molecular sieves having relatively low silicon content using synthesis templates that contain at least one dimethylamino moiety, selected from one or more of N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylbutylenediamine, N,N-dimethylheptylenediamine, N,N-dimethylhexylenediamine 1-dimethylamino-2-propanol, N,N-dimethylethylamine, N,N-dimethylpropylamine, N,N-dimethylpentylamine, N,N-dimethylhexylamine and N,N-dimethylheptylamine. The synthesis is conducted in the absence of fluoride.

U.S. Published Patent Application No. 2004/0253163, published Dec. 16, 2004, discloses the synthesis of silicoaluminophosphate molecular sieves having the CHA framework type employing a template having the formula:

wherein $R^1$ and $R^2$ are independently selected from the group consisting of alkyl groups having from 1 to 3 carbon atoms and hydroxyalkyl groups having from 1 to 3 carbon atoms and $R^3$ is selected from the group consisting of 4- to 8-membered cycloalkyl groups, optionally substituted by 1 to 3 alkyl groups having from 1 to 3 carbon atoms; and 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S. Preferably, the template is selected from N,N-dimethyl-cyclohexylamine, N,N-dimethyl-methyl-cyclohexylamine, N,N-dimethyl-cyclopentylamine, N,N-dimethyl-methyl-cyclopentylamine, N,N-dimethyl-cycloheptylamine, N,N-dimethyl-methylcycloheptylamine, and most preferably is N,N-dimethyl-cyclohexylamine. The synthesis can be effected with or without the presence of fluoride ions and can produce CHA framework type silicoaluminophosphates with a low Si/Al ratio.

SUMMARY OF INVENTION

In one aspect, the invention resides in a method of synthesizing a crystalline aluminophosphate or silicoaluminophosphate molecular sieve having a CHA framework-type, the method comprising:

a) providing a synthesis mixture comprising a source of aluminum, a source of phosphorus, optionally a source of silicon and at least one organic template of formula (I)

(I)

wherein $R^1$, $R^2$ and $R^3$ are independently selected from the group consisting of alkyl groups having from 1 to 3 carbon atoms and hydroxyalkyl groups having from 1 to 3 carbon atoms;

$R^4$ is selected from the group consisting of 4- to 8-membered cycloalkyl groups, optionally substituted by 1 to 3 alkyl groups having from 1 to 3 carbon atoms; 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S; and aromatic groups optionally substituted by 1 to 3 alkyl groups, said alkyl groups having from 1 to 3 carbon atoms; and $X^-$ is an anion, preferably hydroxyl, halogen, phosphate or acetate; and b) inducing crystallization of said crystalline molecular sieve having a CHA framework type.

In one embodiment, $R^1$, $R^2$, and $R^3$ are identical and conveniently are selected from methyl and ethyl, preferably methyl.

Conveniently, $R^4$ is cyclohexyl or phenyl.

In one embodiment, said synthesis mixture comprises at least one further organic template for directing the synthesis of said crystalline molecular sieve having a CHA framework type. Conveniently, said at least one further organic template is selected from tetraethylammonium hydroxide, dipropylamine, cyclohexylamine, morpholine, and a dimethylamine, preferably dimethylcylcohexylamine.

Conveniently, the molar ratio of template to aluminum in the synthesis mixture, expressed as the molar ratio of template to alumina ($Al_2O_3$), is within the range of from 0.6:1.0 to 3.0 to 1.0

Preferably, the synthesis mixture also contains heterostructural, or more preferably, homostructural seeds.

In a further aspect, the invention resides in a crystalline molecular sieve having a CHA framework type and having within its intra-crystalline structure at least one organic template of formula (I).

In yet a further aspect, the invention resides in a process for producing olefins comprising contacting an organic oxygenate compound under oxygenate conversion conditions with a catalyst comprising a crystalline aluminophosphate or silicoaluminophosphate molecular sieve having a CHA framework type produced by the method described herein.

BRIEF DESCRIPTION OF THE DRAWINGS

FIGS. 1(a) to 1(f) are X-ray diffraction patterns of the as-synthesized products of Runs 1 to 6 respectively of Example 2.

FIGS. 3(a) to 3(f) are X-ray diffraction patterns of the as-synthesized products of Runs 1 to 6 respectively of Example 3.

DETAILED DESCRIPTION OF THE EMBODIMENTS

The present invention provides a method for synthesizing crystalline aluminophosphates and silicoaluminophosphates substantially of the CHA framework type. In particular it has been found that certain cycloalkylammonium compounds, for example N,N,N-trimethylcyclohexylammonium and phenyltrimethylammonium compounds, are effective templates in directing the synthesis of aluminophosphate and silicoaluminophosphate molecular sieves of the CHA framework type. Moreover, it has been found that these templates can be used to prepare CHA framework type SAPO molecular sieves of high purity and low Si/Al atomic ratios (i.e. low acidity). In addition, the synthesis can be performed in the absence of fluoride ions and the resultant product has generally uniform silicon distribution.

In its calcined form, the CHA-type molecular sieve produced by the method of the present invention has an X-ray diffraction pattern having the characteristic lines shown in Table 1 below:

TABLE 1

| d(A) | Relative Intensities 100 I/Io |
|---|---|
| 9.23-9.42 | 100 |
| 6.81-6.94 | 20-40 |
| 6.27-6.40 | 1-5 |
| 5.47-5.58 | 5-15 |
| 4.93-5.03 | 5-15 |
| 4.61-4.70 | 0-3 |
| 4.26-4.35 | 20-40 |
| 3.99-4.07 | 0-3 |
| 3.92-4.00 | 0-3 |
| 3.81-3.89 | 1-5 |
| 3.53-3.60 | 3-13 |
| 3.40-3.47 | 2-10 |
| 3.19-3.25 | 0-3 |
| 3.13-3.19 | 0-3 |
| 2.99-3.05 | 0-2 |
| 2.88-2.94 | 8-18 |
| 2.84-2.90 | 1-7 |
| 2.80-2.85 | 0-3 |
| 2.73-2.79 | 0-3 |
| 2.65-2.70 | 0-3 |
| 2.57-2.62 | 1-5 |
| 2.46-2.51 | 1-5 |

These X-ray diffraction data were collected with a Philips powder X-Ray Diffractometer, equipped with a scintillation detector with graphite monochromator, using copper K-alpha radiation. The diffraction data were recorded by step-scanning at 0.02 degrees of two-theta, where theta is the Bragg angle, and a counting time of 1 second for each step. The interplanar spacing, d's, were calculated in Angstrom units, and the relative intensities of the lines, (where $I/I_o$ is one-hundredth of the intensity of the strongest line), above background were determined by integrating the peak intensities. It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the framework atom connectivities. These minor effects, including changes in relative intensities, can also occur as a result of differences in cation content, framework composition, nature and degree of pore filling, crystal size and shape, preferred orientation and thermal and/or hydrothermal history.

In its as-synthesized form, the crystalline material produced by the method of the present invention has the following composition on an anhydrous basis:

$$(m)R:(Si_xAl_yP_z)O_2$$

wherein R represents at least one templating agent and m is the number of moles of R per mole of $(Si_xAl_yP_z)O_2$, m has a value from 0.0417 to 0.3333, preferably from 0.0624 to 0.166, and most preferably from 0.0667 to 0.1; and x, y, and z respectively represent the mole fraction of Si, Al and P as tetrahedral oxides.

In one embodiment, m is greater than or equal to 0.04, x is greater than or equal to 0, and y and z are greater than or equal to 0.01. In another embodiment, m is in the range of from greater than 0.01 to about 0.3333, x is in the range of from greater than 0 to about 0.31, y is in the range of from 0.25 to 1.0, and z is in the range of from 0.25 to 0.9, more preferably m is in the range of from 0.05 to 0.10, x is in the range of from 0.01 to 0.2, most preferably from 0.02 to 0.15, y is in the range of from 0.4 to 0.9, and z is in the range of from 0.3 to 0.9.

When the molecular sieve is calcined the organic template is removed and the resulting aluminophosphate or silicoaluminophosphate has a CHA framework type and is of substantially high purity in terms of its framework type with little or no impurity phases being present. Typically, the product of the present invention comprises 60% or greater, for example 70% or greater, such as 90% or greater, of the CHA framework type material, as determined by XRD.

In one embodiment, the calcined molecular sieve produced by the method of the present invention has a Si/Al ratio of less than 0.167, preferably less than 0.134, more preferably less than 0.100. In a preferred embodiment the Si/Al ratio in the molecular sieve is within the range of from 0 to 0.167, more preferably in the range of from 0.02 to 0.167, even more preferably in the range of from 0.03 to 0.134 and most preferably in the range of from 0.03 to 0.100.

The synthesis method of the invention generally involves the hydrothermal crystallization of a source of aluminum, a source of phosphorous, at least one organic template, and, optionally, a source of silicon. The organic template includes at least one quaternary ammonium compound of formula (I)

$$[R^1R^2R^3N-R^4]^+X^-  \quad (I)$$

wherein $R^1$, $R^2$ and $R^3$ are independently selected from the group consisting of alkyl groups having from 1 to 3 carbon atoms and hydroxyalkyl groups having from 1 to 3 carbon atoms;

$R^4$ is selected from the group consisting of 4- to 8-membered cycloalkyl groups, optionally substituted by 1 to 3 alkyl groups having from 1 to 3 carbon atoms; 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S; and aromatic groups optionally substituted by 1 to 3 alkyl groups, said alkyl groups having from 1 to 3 carbon atoms; and X⁻ is an anion, preferably hydroxyl, halogen, phosphate or acetate.

Preferably the template includes an N,N,N-trimethylcyclohexylammonium compound and/or a phenyltrimethylammonium compound.

In addition to an organic template of formula (I), the synthesis mixture can also contain a further template known to direct the synthesis of CHA framework type molecular sieves, such as tetraethylammonium hydroxide, dipropylamine, cyclohexylamine, morpholine, and a dimethylamine. Suitable dimethylamines are described in U.S. Published Patent Application No. 2003/0232006 and include N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylbutylenediamine, N,N-dimethylheptylenediamine, N,N-dimethylhexylenediamine 1-dimethylamino-2-propanol, N,N-dimethylethylamine, N,N-dimethylpropylamine, N,N-dimethylpentylamine, N,N-dimethylhexylamine and N,N-dimethylheptylamine. Preferably the further template is dimethylcylcohexylamine.

Typically, the template or mixture of templates is used in an amount such that the molar ratio of template to alumina ($Al_2O_3$) in the reaction mixture is within the range of from 0.6:1.0 to 3.0:1.0, preferably from 1.0:1.0 to 2.0:1.0.

The sources of aluminum, phosphorus and silicon suitable for use in the synthesis of molecular sieves according to the present invention are typically those known in the art or as described in the literature for the production of the SAPO concerned. The aluminum source may be, for example, an aluminum oxide (alumina), optionally hydrated, an aluminum salt, especially a phosphate, an aluminate, or a mixture thereof. A preferred source is a hydrated alumina, most preferably pseudoboehmite, which contains about 75% $Al_2O_3$ and 25% $H_2O$ by weight. Advantageously, the source of phosphorus is a phosphoric acid, especially orthophosphoric acid, but other sources, for example, organic phosphates, e.g., triethyl phosphate, and aluminophosphates may be used. Advantageously, the source of silicon is silica, for example colloidal silica, fumed silica, or an organic silicon source, e.g., a tetraalkyl orthosilicate, especially tetraethyl orthosilicate.

Typically, the reaction mixture also contains seeds to facilitate the crystallization process. The amount of seeds employed can vary widely, but generally the reaction mixture comprises from about 0.1 ppm by weight to about 10,000 ppm by weight, such as from about 100 ppm by weight to about 5,000 by weight, of said seeds. Preferably, the seeds are homostructural with the desired product, that is, are of a CHA framework type material, although heterostructural seeds of, for example, an AEI, LEV, ERI, AFX or OFF framework-type molecular sieve, may be used. The seeds may be added to the reaction mixture as a colloidal suspension in a liquid medium, such as water. The production of colloidal seed suspensions and their use in the synthesis of molecular sieves are disclosed in, for example, International Publication Nos. WO 00/06493 and WO 00/06494 published on Feb. 10, 2000 and incorporated herein by reference.

Conveniently, the reaction mixture has a pH of about 2 to about 10 such as about 3 to about 9, for example about 4 to about 8.

Crystallization can be carried out at either static or stirred conditions in a suitable reactor vessel, such as for example, polypropylene jars or Teflon-lined or stainless steel autoclaves, at a temperature of about 120° C. to about 220° C., such as about 140° C. to about 200° C., for a time sufficient for crystallization to occur. Formation of the crystalline product can take anywhere from around 30 minutes up to as much as 2 weeks, such as from about 45 minutes to about 240 hours, for example from about 1.0 to about 120 hours. The duration depends on the temperature employed, with higher temperatures typically requiring shorter hydrothermal treatments.

Typically, the crystalline product is formed in solution and can be recovered by standard means, such as by centrifugation or filtration. The separated product can also be washed, recovered by centrifugation or filtration and dried. The resultant product is found to comprise particles with an average crystal size below 5 microns, such as below 2 microns and typically about 1 micron or less.

As a result of the crystallization process, the recovered crystalline product contains within its pores at least a portion of the organic directing agent used in the synthesis. In a preferred embodiment, activation is performed in such a manner that the organic directing agent is removed from the molecular sieve, leaving active catalytic sites within the microporous channels of the molecular sieve open for contact with a feedstock. The activation process is typically accomplished by calcining, or essentially heating the molecular sieve comprising the template at a temperature of from about 200° C. to about 800° C. in the presence of an oxygen-containing gas. In some cases, it may be desirable to heat the molecular sieve in an environment having a low or zero oxygen concentration. This type of process can be used for partial or complete removal of the organic directing agent from the intracrystalline pore system. In other cases, particularly with smaller organic directing agents, complete or partial removal from the sieve can be accomplished by conventional desorption processes.

Once the CHA framework-type containing material of the invention has been synthesized, it can be formulated into a catalyst composition by combination with other materials, such as binders and/or matrix materials, that provide additional hardness or catalytic activity to the finished catalyst.

Materials which can be blended with the CHA framework-type containing material of the invention can be various inert or catalytically active materials. These materials include compositions such as kaolin and other clays, various forms of rare earth metals, other non-zeolite catalyst components, zeolite catalyst components, alumina or alumina sol, titania, zirconia, quartz, silica or silica sol, and mixtures thereof. These components are also effective in reducing overall catalyst cost, acting as a thermal sink to assist in heat shielding the catalyst during regeneration, densifying the catalyst and increasing catalyst strength. When blended with such components, the amount of zeolitic material contained in the final catalyst product ranges from 10 to 90 weight percent of the total catalyst, preferably 20 to 70 weight percent of the total catalyst.

The CHA framework type material produced by the method of the invention can be used to dry gases and liquids; for selective molecular separation based on size and polar properties; as an ion-exchanger; as a chemical carrier; in gas chromatography; and as a catalyst in organic conversion reactions. Examples of suitable catalytic uses of the crystalline material produced by the method of the invention include (a) hydrocracking of heavy petroleum residual feedstocks, cyclic stocks and other hydrocrackate charge stocks, normally in the presence of a hydrogenation component selected from Groups 6 and 8 to 10 of the Periodic Table of Elements; (b) dewaxing, including isomerization dewaxing, to selectively remove straight chain paraffins from hydrocarbon feedstocks typically boiling above 177° C., including raffinates and lubricating oil basestocks; (c) catalytic cracking of hydrocarbon feedstocks, such as naphthas, gas oils and residual oils, normally in the presence of a large pore cracking catalyst, such as zeolite Y; (d) oligomerization of straight and branched chain olefins having from about 2 to 21, preferably 2 to 5 carbon atoms, to produce medium to heavy olefins which are useful for both fuels, i.e., gasoline or a gasoline blending stock, and chemicals; (e) isomerization of olefins, particularly olefins having 4 to 6 carbon atoms, and especially normal butene to produce iso-olefins; (f) upgrading of lower alkanes, such as methane, to higher hydrocarbons, such as ethylene and benzene; (g) disproportionation of alkylaromatic hydrocarbons, such as toluene, to produce dialkylaromatic hydrocarbons, such as xylenes; (h) alkylation of aromatic hydrocarbons, such as benzene, with olefins, such as ethylene and propylene, to produce ethylbenzene and cumene; (i) isomerization of dialkylaromatic hydrocarbons, such as xylenes, (j) catalytic reduction of nitrogen oxides and (k) synthesis of monoalkylamines and dialkylamines.

In particular, the crystalline material produced by the method of the invention is useful in the catalytic conversion of oxygenates to one or more olefins, particularly ethylene and propylene. As used herein, the term "oxygenates" is defined to include, but is not necessarily limited to aliphatic alcohols, ethers, carbonyl compounds (aldehydes, ketones, carboxylic acids, carbonates, and the like), and also compounds containing hetero-atoms, such as, halides, mercaptans, sulfides, amines, and mixtures thereof. The aliphatic moiety will normally contain from about 1 to about 10 carbon atoms, such as from about 1 to about 4 carbon atoms.

Representative oxygenates include lower straight chain or branched aliphatic alcohols, their unsaturated counterparts, and their nitrogen, halogen and sulfur analogues. Examples of suitable oxygenate compounds include methanol; ethanol; n-propanol; isopropanol; $C_4$-$C_{10}$ alcohols; methyl ethyl ether; dimethyl ether; diethyl ether; di-isopropyl ether; methyl mercaptan; methyl sulfide; methyl amine; ethyl mercaptan; di-ethyl sulfide; di-ethyl amine; ethyl chloride; formaldehyde; di-methyl carbonate; di-methyl ketone; acetic acid; n-alkyl amines, n-alkyl halides, n-alkyl sulfides having n-alkyl groups of comprising the range of from about 3 to about 10 carbon atoms; and mixtures thereof. Particularly suitable oxygenate compounds are methanol, dimethyl ether, or mixtures thereof, most preferably methanol. As used herein, the term "oxygenate" designates only the organic material used as the feed. The total charge of feed to the reaction zone may contain additional compounds, such as diluents.

In the present oxygenate conversion process, a feedstock comprising an organic oxygenate, optionally with one or more diluents, is contacted in the vapor phase in a reaction zone with a catalyst comprising the molecular sieve of the present invention at effective process conditions so as to produce the desired olefins. Alternatively, the process may be carried out in a liquid or a mixed vapor/liquid phase. When the process is carried out in the liquid phase or a mixed vapor/liquid phase, different conversion rates and selectivities of feedstock-to-product may result depending upon the catalyst and the reaction conditions.

When present, the diluent(s) is generally non-reactive to the feedstock or molecular sieve catalyst composition and is typically used to reduce the concentration of the oxygenate in the feedstock. Non-limiting examples of suitable diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred. Diluent(s) may comprise from about 1 mol % to about 99 mol % of the total feed mixture.

The temperature employed in the oxygenate conversion process may vary over a wide range, such as from about 200° C. to about 1000° C., for example from about 250° C. to about 800° C., including from about 250° C. to about 750° C., conveniently from about 300° C. to about 650° C., typically from about 350° C. to about 600° C. and particularly from about 400° C. to about 600° C.

Light olefin products will form, although not necessarily in optimum amounts, at a wide range of pressures, including but not limited to autogenous pressures and pressures in the range of from about 0.1 kPa to about 10 MPa. Conveniently, the pressure is in the range of from about 7 kPa to about 5 MPa, such as in the range of from about 50 kPa to about 1 MPa. The foregoing pressures are exclusive of diluent, if any is present, and refer to the partial pressure of the feedstock as it relates to oxygenate compounds and/or mixtures thereof. Lower and upper extremes of pressure may adversely affect selectivity, conversion, coking rate, and/or reaction rate; however, light olefins such as ethylene still may form.

The process should be continued for a period of time sufficient to produce the desired olefin products. The reaction time may vary from tenths of seconds to a number of hours. The reaction time is largely determined by the reaction temperature, the pressure, the catalyst selected, the weight hourly space velocity, the phase (liquid or vapor) and the selected process design characteristics.

A wide range of weight hourly space velocities (WHSV) for the feedstock will function in the present process. WHSV is defined as weight of feed (excluding diluent) per hour per weight of a total reaction volume of molecular sieve catalyst (excluding inerts and/or fillers). The WHSV generally should be in the range of from about 0.01 $hr^{-1}$ to about 500 $hr^{-1}$, such as in the range of from about 0.5 $hr^{-1}$ to about 300 $hr^{-1}$, for example in the range of from about 0.1 $hr^{-1}$ to about 200 $hr^{-1}$.

A practical embodiment of a reactor system for the oxygenate conversion process is a circulating fluid bed reactor with continuous regeneration, similar to a modern fluid catalytic cracker. Fixed beds are generally not preferred for the process because oxygenate to olefin conversion is a highly exothermic process which requires several stages with intercoolers or other cooling devices. The reaction also results in a high pressure drop due to the production of low pressure, low density gas.

Because the catalyst must be regenerated frequently, the reactor should allow easy removal of a portion of the catalyst to a regenerator, where the catalyst is subjected to a regeneration medium, such as a gas comprising oxygen, for example air, to burn off coke from the catalyst, which restores the catalyst activity. The conditions of temperature, oxygen partial pressure, and residence time in the regenerator should be selected to achieve a coke content on regenerated catalyst of less than about 0.5 wt %. At least a portion of the regenerated catalyst should be returned to the reactor.

In one embodiment, the catalyst is pretreated with dimethyl ether, a $C_2$-$C_4$ aldehyde composition and/or a $C_4$-$C_7$ olefin composition to form an integrated hydrocarbon co-catalyst within the porous framework of the CHA framework-type molecular sieve prior to the catalyst being used to convert oxygenate to olefins. Desirably, the pretreatment is conducted at a temperature of at least 10° C., such as at least 25° C., for example at least 50° C., higher than the temperature used for the oxygenate reaction zone and is arranged to produce at least 0.1 wt %, such as at least 1 wt %, for example at least about 5 wt % of the integrated hydrocarbon co-catalyst, based on total weight of the molecular sieve. Such preliminary treating to increase the carbon content of the molecular sieve is known as "pre-pooling" and is further described in U.S. application Ser. Nos. 10/712668, 10/712952 and 10/712953 all of which were filed Nov. 12, 2003 and are incorporated herein by reference.

The invention will now be more particularly described with reference to the following Examples and the accompanying drawings.

In the Examples, X-ray Powder Diffractograms were recorded on a Siemens D500 diffractometer with voltage of 40 kV and current of 30 mA, using a Cu target and Ni-filter (A=0.154 nm). Elemental analysis of Al, Si, and P was performed using the Inductively Coupled Plasma (ICP) spectroscopy.

EXAMPLE 1

Preparation of Trimethylcyclohexylammonium (TMCHAOH) Template

To a solution of 50.0 g N,N-dimethylcyclohexylamine (DMCHA, 0.393 mole) in 50 g ethanol, contained in a round-bottom flask and chilled with an ice bath, was added dropwise 66.9 g iodomethane (0.472 mole) over 30 minutes with stirring. All reagents were reagent grade from Aldrich and were used as received. The reaction proceeded gradually, forming a white precipitate. The mixture was allowed to warm up to room temperature and the reaction was continued for another five hours with stirring and occasional shaking. The mixture was then chilled in a refrigerator (3° C.) before the solid product was isolated by filtration. The solid was washed with chilled acetone before drying in air at room temperature. The isolated trimethylcyclohexyl-ammonium iodide (TMCHAI) weighed 107.5 g (yield 92.0% based on DMCHA).

Ion exchange of the TMCHAI to the hydroxide form was performed by first dissolving 60.0 g TMCHAI (0.223 mole) in 100 g deionized water. Then 84 g of the hydroxide form AG® 1-X8 anion exchange resin (Bio Rad Laboratories) was added to the solution. The mixture was stirred at room temperature for one hour before the resin was filtered out and washed with deionized water several times. The filtrate was combined with the washings, and to the combined solution was added another 28 g of the ion-exchange resin. After stirring for another hour, the resin was filtered out and washed with water several times. The filtrate was again combined with the washings. The volume of the final solution was about 200 mL. This solution was concentrated by warming the solution on a hot plate and blowing $N_2$ over it, until the final weight of the solution reached 118.4 g. The temperature did not exceed 50° C. during the concentration process. Acid titration of the hydroxide solution determined that the ion exchange was nearly quantitative (99%). The solution so obtained contained 30 wt % TMCHAOH.

EXAMPLE 2

Preparation of [SAPO]-CHA Using Trimethylcyclohexylammonium (TMCHAOH) As Template The following ingredients were mixed, in sequence, and blended into a uniform gel using a microhomogenizer (Tissue Tearor Model 98730 available from Biospec Products, Inc, USA): 85 wt % $H_3PO_4$ (obtained from Aldrich Chemical Company), $H_2O$, Catapal™ A (74 wt % $Al_2O_3$, available from CONDEA Vista Company, Texas, USA), Cabosil™ silica (available from Cabot Corporation, Illinois, USA), and then 30% trimethylcyclohexylammonium hydroxide (TMCHAOH), obtained as described in Example 1. Three separate mixtures were produced with molar ratio of the ingredients being as follows:

1.5 TMCHAOH:1.0 $Al_2O_3$:(0.1, 0.2, and 0.3) $SiO_2$:1.0 $P_2O_5$:40 $H_2O$

As a more detailed example, for $SiO_2$=0.1 mixture, 0.93 g deionized $H_2O$ was first added to 5.72 g 85 wt % $H_3PO_4$. Then 3.42 g Catapal™ A, 0.17 g Cabosil™ and 19.75 g 30% trimethylcyclohexylamine were sequentially and slowly added with thorough mixing (using the homogenizer) to form a thin gel. The pH of the gel was between 5 and 6 as measured with pH paper. This gel was divided into two equal portions. To portion A were added 100 ppm colloidal SAPO-34 seeds while no seeds were added to portion B. Both gels were then sealed in Teflon lined Parr autoclaves. The autoclaves were placed in an oven whose temperature was set at 170° C., and were tumbled at 40 rpm. They were taken out of the oven after 2 days. After quench cooling of the bombs with running tap water, the bombs were opened and the pH of the supernatants was measured to be between 7 and 8. The solid products in the autoclaves were centrifuged and washed several times with deionized water, until the conductivity of the washing liquid was below 50 µS/cm and were then dried in a 60° C. vacuum oven overnight.

The same procedure was repeated for the $SiO_2$=0.2 and 0.3 mixtures X-ray powder diffraction patterns of the products for $SiO_2$=0.1, 0.2, and 0.3, with and without seeds, are shown in FIGS. 1(a) to (f). As can be seen, the crystalline products all comprise [SAPO]-CHA molecular sieves, i.e., silicoaluminophosphates having the chabazite framework type.

Figures 1A, 1F:
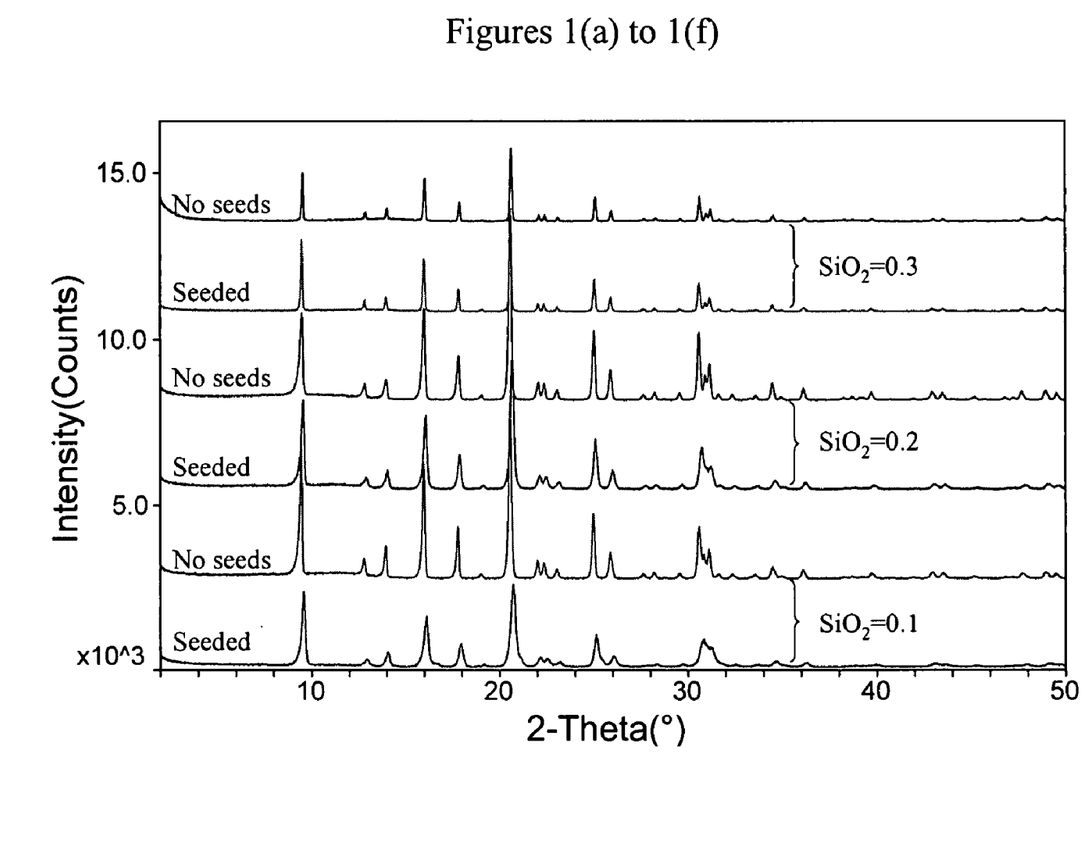
Figure 2:
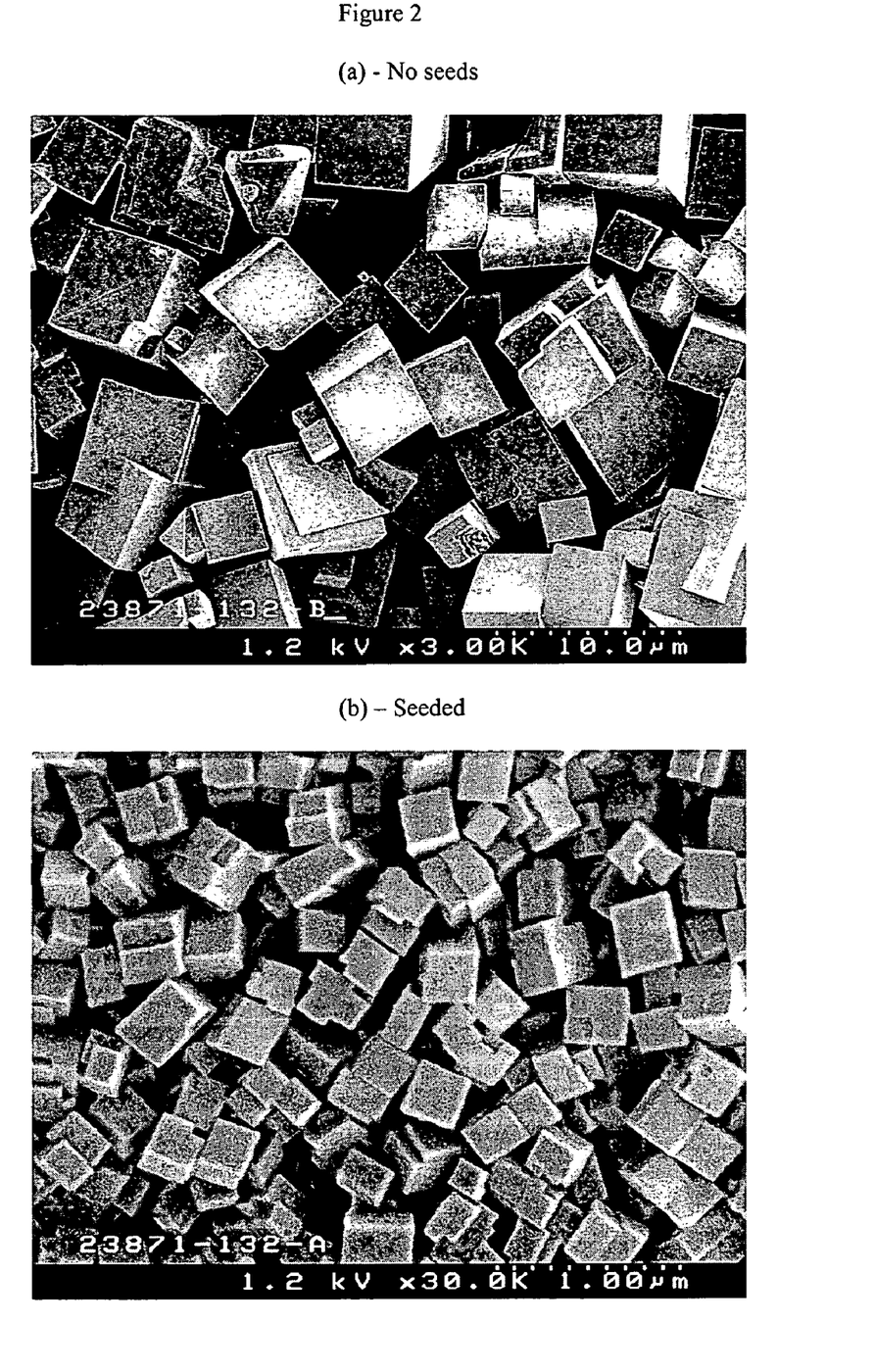
FIGS. 2(a) and 2(b) are SEM pictures of the products of Runs 1 and 2 respectively of Example 2.

Table 2 shows the product yields of these syntheses and the results of elemental analysis of these products. The composition of these products indicates that low-Si [SAPO]-CHA (0.65 Si/CHA cage) can be obtained with the new template, and seeding helps both to increase the yield and the lower Si/Al ratio of the products. Seeding also reduces the crystal size, e.g., from 3-5 µm cubes without seeds to 0.2-0.4 µm cubes with seeds in the case of $SiO_2/Al_2O_3$=0.1 (see FIGS. 2(a) and (b) respectively).

TABLE 2

| Run | $SiO_2$/$Al_2O_3$ | Seeds ppm | Yield | Product Formula | | | Si/CHA cage |
|---|---|---|---|---|---|---|---|
| | | | | Al | Si | P | |
| 1 | 0.1 | 100 | 10.7 | 1 | 0.108 | 0.887 | 0.65 |
| 2 | 0.1 | 0 | 6.7 | 1 | 0.135 | 0.891 | 0.81 |
| 3 | 0.2 | 100 | 11.2 | 1 | 0.127 | 0.886 | 0.76 |
| 4 | 0.2 | 0 | 10.4 | 1 | 0.174 | 0.810 | 1.04 |
| 5 | 0.3 | 100 | 9.4 | 1 | 0.198 | 0.902 | 1.19 |
| 6 | 0.3 | 0 | 15.4* | 1 | 0.159 | 0.550 | 0.95 |

*Product contaminated with amorphous material.

EXAMPLE 3

Preperation of [SAPO]-CHA Using Phenyltrimethylammonium (PTMAOH) As Template The procedure of Example 2 was followed, except that the template was 25 wt % aqueous solution of phenyltrimethylammonium hydroxide, which was obtained from Fluka Chemika, Switzerland. Three separate gel compositions were prepared having the following oxide molar ratios.

1.5 PTMAOH:1.0 $Al_2O_3$:(0.1, 0.2, and 0.3) $SiO_2$:1.0 $P_2O_5$:45 $H_2O$

Figures 3A, 3F:
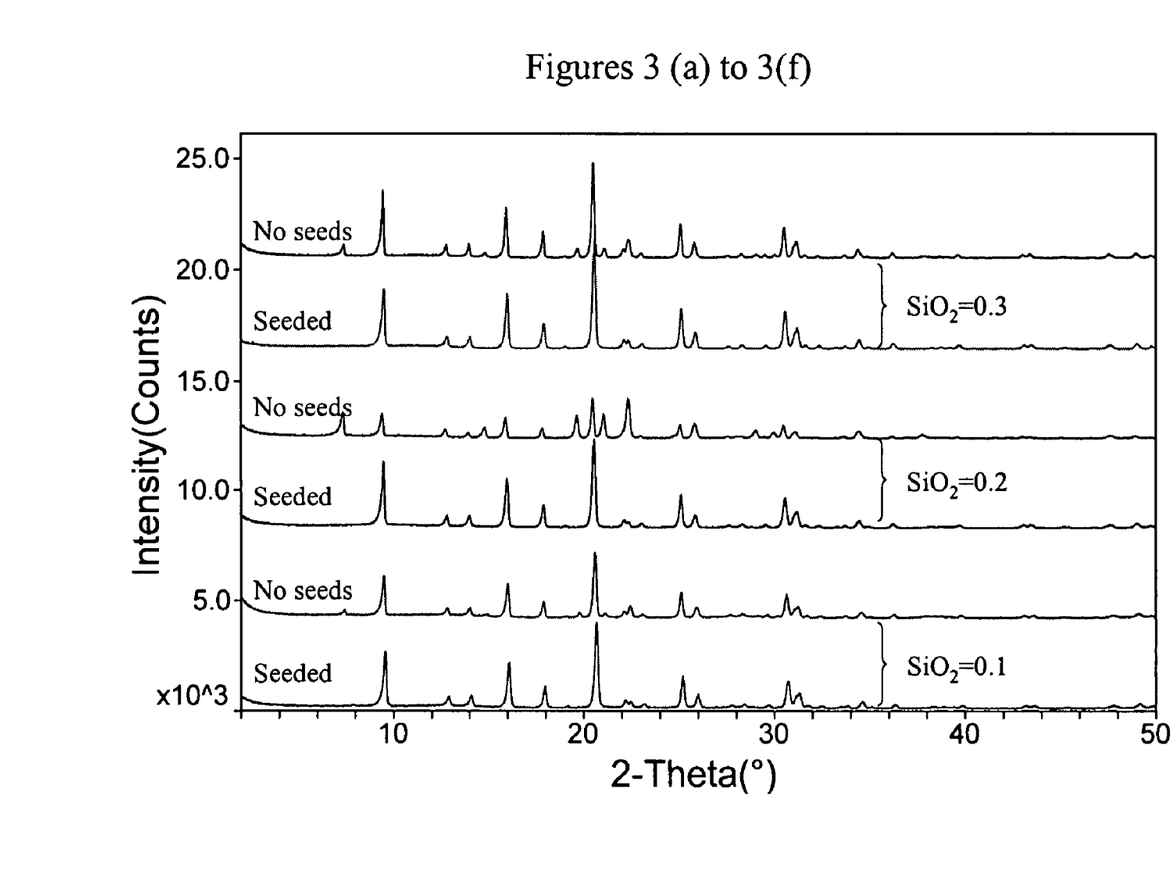

Each gel was divided into 2 portions, to one of which were added 100 ppm colloidal SAPO-34 seeds while no seeds were added to the other portion. Crystallization was carried out at 170° C. for three days in a tumbling oven at 40 rpm. FIGS. 3 (*a*) to (*f*) show the XRD pattern of the products obtained. The results clearly show that essentially pure [SAPO]-CHA was obtained when seeds were used. Without seeding, however, the products were all contaminated with crystalline impurity having the AFI framework.

Table 3 shows the product yields and the results of elemental analysis, for the pure products only. The results show that low-Si [SAPO]-CHA (0.59 Si/CHA cage) is attainable with the new template PTMAOH, and the yields are high, considering the high water content of the synthesis gel ($H_2O$/$Al_2O_3$=45).

TABLE 3

| Run | $SiO_2$/$Al_2O_3$ | Seeds ppm | Yield | Product Formula Al | Si | P | Si/CHA cage |
|---|---|---|---|---|---|---|---|
| 1 | 0.1 | 100 | 16.4 | 1 | 0.098 | 0.887 | 0.59 |
| 2 | 0.1 | 0 | 17.8 | | | | |
| 3 | 0.2 | 100 | 16.4 | 1 | 0.144 | 0.959 | 0.86 |
| 4 | 0.2 | 0 | 14.3* | | | | |
| 5 | 0.3 | 100 | 12.5 | 1 | 0.202 | 1.027 | 1.21 |
| 6 | 0.3 | 0 | 18.6* | | | | |

*Product contaminated with amorphous material.

EXAMPLE 4

Preparation of [SAPO]-CHA Using Mixed (TMCHAOH And DMCHA) Template

The procedure of Example 2 was followed, except that both TMCHAOH and dimethylcyclohexylamine (DMCHA) were used as the organic templates. The gel composition was the following (all samples were seeded with 100 ppm colloidal SAPO-34):

0.5 TMCHAOH:1.0 DMCHA:(0.1, 0.2, and 0.3) $SiO_2$: 1.0 $P_2O_5$:40 $H_2O$

Figure 4:
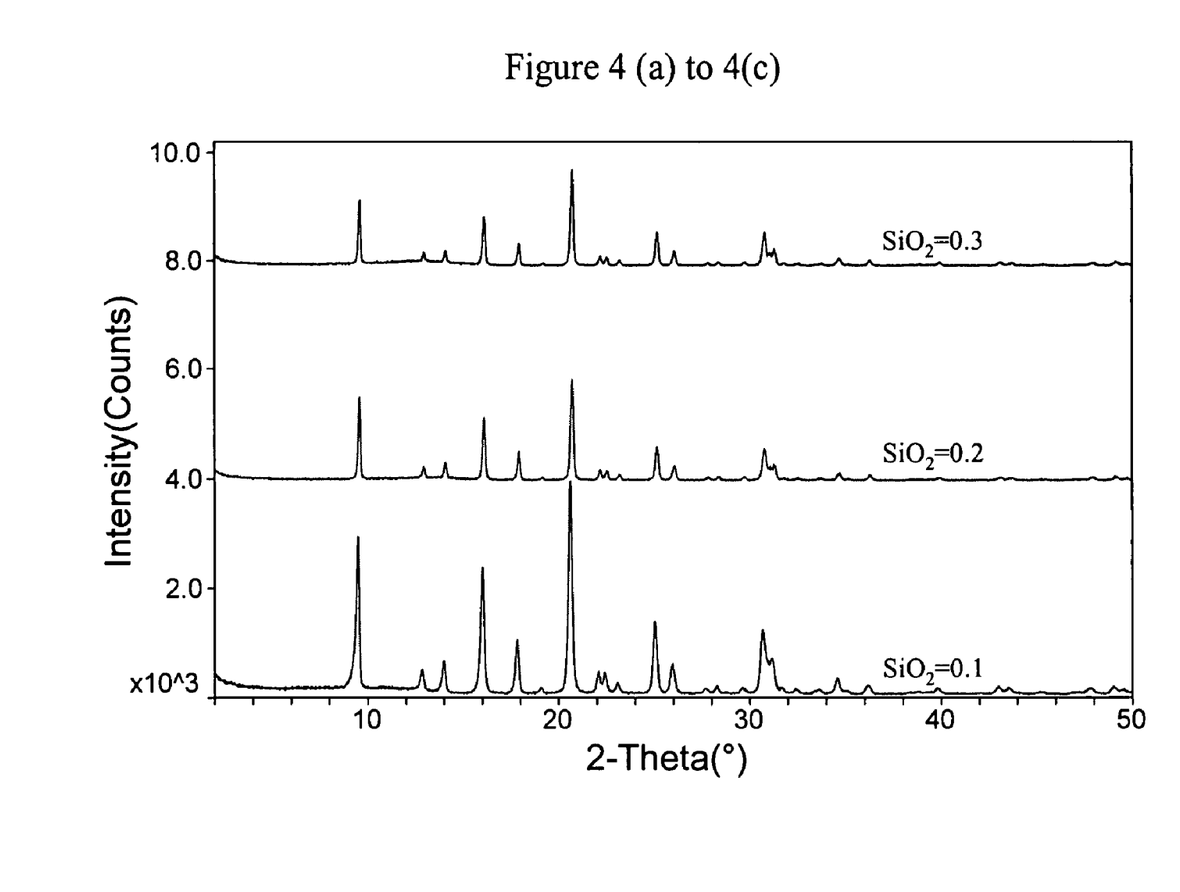
FIGS. 4(a) to 4(c) are X-ray diffraction patterns of the as-synthesized products of Runs 1 to 3 respectively of Example 4.

Crystallization was carried out at 170° C. for three days in a tumbling oven (set at 40 rpm). FIG. 4 shows the XRD pattern of the products obtained. The results clearly show that essentially pure [SAPO]-CHA was obtained.

Table 4 shows the product yields and the results of elemental analysis of the products. The results show that low-Si [SAPO]-CHA (0.60 Si/CHA cage) is attainable with the combined templates, and the yields are moderately high.

TABLE 4

| Run | $SiO_2$/$Al_2O_3$ | Seeds ppm | Yield | Product Formula Al | Si | P | Si/CHA cage |
|---|---|---|---|---|---|---|---|
| 1 | 0.1 | 100 | 13.2 | 1 | 0.100 | 1.024 | 0.60 |
| 2 | 0.2 | 100 | 15.0 | 1 | 0.122 | 1.016 | 0.73 |
| 3 | 0.3 | 100 | 14.3 | 1 | 0.151 | 0.980 | 0.91 |

This example illustrates the potential of combining one of the new quaternary ammonium templates with various known templates, such as DMCHA, morpholine, or N,N-dimethylethanolamine (DMEA), for [SAPO]-CHA.

EXAMPLE 5

MTO Performance of Example 2 Product Versus AEI/CHA Intergrowth Type Material The product made in Example 2 (seeded, $Sio_2$=0.1) and an AEI/CHA intergrowth made according to U.S. Patent Application Publication No. 2002/0165089 with a product Si/Al of 0.055 were tested on a microreactor unit. The sieves were calcined with a ramp of 10° C./min to 650° C., and then held at that temperature for two hours in a muffle furnace with flowing air. The calcined sieves were pelletized, and the granules of a certain range of mesh sizes were loaded into the microreactor. The MTO reaction temperature was 475° C., the methanol pressure was 40 psia (no diluent), and the feed rate was 100/hr WHSV. The results are shown in Table 5.

TABLE 5

| Run | MeOH conv. g | POS | POR | $C_4$+ | $CH_4$ | $C_2$= | $C_2$° | $C_3$= | $C_3$° | Coke |
|---|---|---|---|---|---|---|---|---|---|---|
| Ex. 2 | 20.1 | 75.3 | 0.90 | 19.77 | 1.474 | 35.68 | 0.383 | 39.46 | 0.661 | 2.14 |
| AEI/CHA | 13.4 | 74.64 | 0.85 | 19.35 | 1.910 | 34.24 | 0.327 | 40.40 | 0.608 | 2.80 |

The results show that the sieve made with the new template TMCHAOH outperforms the intergrowth material chosen for the comparison, illustrating that good performing MTO catalysts can be obtained with the new quaternary ammonium templates.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We Claim:

1. A method of synthesizing a crystalline aluminophosphate or silicoaluminophosphate molecular sieve having a CHA framework-type, the method comprising:
   a) providing a synthesis mixture comprising a source of aluminum, a source of phosphorus, optionally a source of silicon and at least one organic template, and seeds comprising a crystalline material having a CHA framework-type, wherein the at least one organic template is selected from salts of trimethylcyclohexylammonium, phenyltrimethylammonium, and mixtures thereof; and b) inducing crystallization of the synthesis mixture to form a crystalline molecular sieve having a CHA framework type and a Si/Al ratio of less than 0.167; and wherein the crystalline molecular sieve is in the form of cubes with an average crystal size of below 2 microns.

2. The method of claim 1 wherein the organic template is a salt of hydroxyl, halogen, phosphate or acetate.

3. The method of claim 1 wherein said synthesis mixture comprises at least one further organic template for directing the synthesis of said crystalline molecular sieve having a CHA framework type.

4. The method of claim 3 wherein said at least one further organic template is selected from tetraethylammonium hydroxide, dipropylamine, cyclohexylamine, morpholine, and a dimethylamine.

5. The method of claim 3 wherein said at least one further organic template is dimethylcylcohexylamine.

6. The method of claim 1 wherein the molar ratio of template to aluminum in the synthesis mixture, expressed as the molar ratio of template to alumina ($Al_2O_3$), is within the range of from 0.6:1.0 to 3.0 to 1.0.

7. The method of claim 1 wherein said synthesis mixture comprises from about 0.01 ppm by weight to about 10,000 ppm by weight of seeds.

8. The method of claim 1 wherein said synthesis mixture comprises from about 100 ppm by weight to about 5,000 ppm by weight of seeds.

9. The process of claim 1 wherein fluoride ions are absent.

10. The method of claim 1 wherein the crystalline molecular sieve is in the form of 0.2 to 0.4 μm cubes.

* * * * *